United States Patent
O'Dwyer et al.

(10) Patent No.: US 6,294,629 B1
(45) Date of Patent: Sep. 25, 2001

(54) CYANOACRYLATE COMPOSITIONS

(75) Inventors: Liam P. O'Dwyer, Celbridge; Fergal W. Tierney, Garristown, both of (IE)

(73) Assignee: Loctite (R&D) Limited, Dublin (IE)

( * ) Notice: Subject to any disclaimer, the term of this patent is extended or adjusted under 35 U.S.C. 154(b) by 0 days.

(21) Appl. No.: 09/447,209

(22) Filed: Nov. 23, 1999

Related U.S. Application Data

(60) Provisional application No. 60/109,522, filed on Nov. 23, 1998.

(51) Int. Cl.$^7$ .............. C09J 4/04; C08F 220/34; C08F 4/00

(52) U.S. Cl. .............. 526/297; 156/331.2; 156/331.8; 524/377; 524/753; 524/762; 526/194; 526/204; 526/208; 526/209

(58) Field of Search .............. 156/331.2, 331.8; 524/377, 753, 762; 526/194, 204, 208, 209, 297

(56) References Cited

U.S. PATENT DOCUMENTS

| 4,313,865 | * | 2/1982 | Teramoto | 524/762 |
| 4,556,700 | | 12/1985 | Harris | 526/209 |
| 4,622,414 | | 11/1986 | McKervey | 560/61 |
| 4,636,539 | | 1/1987 | Harris | 523/214 |
| 4,695,615 | | 9/1987 | Leonard | 526/194 |
| 4,718,966 | | 1/1988 | Harris | 156/331.2 |
| 4,837,260 | * | 6/1989 | Sato et al. | 524/377 |
| 5,312,864 | | 5/1994 | Wenz | 524/716 |

OTHER PUBLICATIONS

H.V. Coover, D.W. Dreifus and J.T. O'Connor, "Cyanoacrylate Adhesives" in *Handbook of Adhesives*, 27, 463–77, I. Skeist, ed., Van Nostrand Reinhold, New York, 3$^{rd}$ ed. (1990).

G.H. Miller "Cyanoacrylate Adhesives" in *Structural Adhesives: Chemistry and Technology*, S.R. Hartshorn, ed., Plenun Press, New York, p. 249–307 (1986).

* cited by examiner

*Primary Examiner*—Peter Szekely
(74) *Attorney, Agent, or Firm*—Steven C. Bauman

(57) ABSTRACT

This invention relates to cyanoacrylate-containing compositions that include, in addition to the cyanoacrylate component, the combination of two accelerators to improve fixture speeds on certain substrates.

23 Claims, No Drawings

CYANOACRYLATE COMPOSITIONS

This application claims benefit of provisional No. 60/109,552 filed Nov. 23, 1998.

BACKGROUND OF THE INVENTION

1. Field of the Invention

This invention relates to cyanoacrylate-containing compositions that include, in addition to the cyanoacrylate component, the combination of two accelerators to improve fixture speeds on certain substrates.

2. Brief Description of Related Technology

Cyanaoacrylate adhesive compositions are well known, and widely used as quick setting, instant adhesives with a wide variety of uses. See H. V. Coover, D. W. Dreifus and J. T. O'Connor, "Cyanoacrylate Adhesives" in *Handbook of Adhesives*, 27, 463–77, I. Skeist, ed., Van Nostrand Reinhold, New York, 3rd ed. (1990). See also, G. H. Millet "Cyanoacrylate Adhesives" in *Structural Adhesives: Chemistry and Technology*, S. R. Hartshorn, ed., Plenun Press, New York, p. 249–307 (1986).

Nonetheless, various techniques have been used to improve further the fixture times of such adhesive compositions for certain applications where it is important to be able to secure one substrate to another quickly, while allowing the bond strength to develop over time. In addition, substrates constructed of certain materials have proven in the past difficult to bond, irrespective of the application to which the adhesive and the substrate are to be placed.

To combat these issues, Loctite Corporation developed a technology based on calixarene and oxacalixarene compounds. Generally, the addition of such materials to a cyanoacrylate allow for accelerated fixturing of substrates to-be-bonded together. See U.S. Pat. Nos. 4,556,700, 4,622,414, 4,636,539, 4,695,615, 4,718,966, and 4,855,461.

In addition to calixarene compounds, Loctite Corporation also developed technology based on the addition of silacrown compounds to cyanoacrylate adhesive compositions to accelerate fixturing. For instance, U.S. Pat. No. 4,906,317 (Liu) is directed to cyanoacrylate adhesive compositions which include silacrown compounds as additives to give substantially reduced fixture and cure times on de-activating substrates such as wood. The silacrown compounds are preferably employed at levels of about 0.1–5% by weight of the composition.

More recently, Henkel KgaA developed technology based on the addition to cyanoacrylate compositions of cyclodextrins to accelerate fixturing. In U.S. Pat. No. 5,312,864 (Wenz), the acceleration of the setting properties of a cyanoacrylate adhesive composition by adding thereto a hydroxyl group derivative of an α-, β- or γ-cyclodextrin which is at least partly soluble in the cyanoacrylate is described.

Other approaches have also been investigated, such as in U.S. Pat. No. 4,837,260 (Sato), in which it is reported the use of crown ethers in cyanoacrylate adhesive compositions.

Notwithstanding the state-of-the-technology it would be desirable to provide alternative technologies to improve the fixturing speed of cyanoacrylates.

SUMMARY OF THE INVENTION

The present invention is directed to a cyanoacrylate-based composition, which includes beyond the cyanoacrylate component, two accelerator components, the combination of which demonstrates improved fixture speeds, particularly on substrates constructed of materials, such as certain woods, cotton and cork and combinations thereof.

The two accelerator components may be referred to herein as the first accelerator and the second accelerator, with the first accelerator selected from calixarenes and oxacalixarenes, silacrowns, crown ethers and cyclodextrins, and the second accelerator selected from poly(ethyleneglycol) di(meth)acrylates and ethoxylated hydric compounds.

This invention is also directed to a method of bonding together two substrates, at least one of which is constructed of a material, such as certain woods, cotton and cork, and combinations thereof. The method includes applying to at least one of the substrates a composition as described above, and thereafter mating together the substrates.

In addition, the present invention is directed to reaction products of the inventive compositions.

Also, the invention is directed to a method of preparing the inventive compositions.

The invention will be more fully understood by a reading of the section entitled "Detailed Description of the Invention", which follows.

DETAILED DESCRIPTION OF THE INVENTION

As noted above, this invention is directed to a cyanoacrylate-based composition, which includes beyond the cyanoacrylate component, two accelerator components, the combination of which demonstrates improved fixture speeds, particularly on substrates constructed of a material, such as certain woods, cotton and cork, and combinations thereof.

The cyanoacrylate component includes cyanoacrylate monomers which may be chosen with a raft of substituents, such as those represented by $H_2C=C(CN)-COOR$, where R is selected from $C_{1-15}$ alkyl, alkoxyalkyl, cycloalkyl, alkenyl, aralkyl, aryl, allyl and haloalkyl groups. Desirably, the cyanoacrylate monomer is selected from methyl cyanoacrylate, ethyl-2-cyanoacrylate, propyl cyanoacrylates, butyl cyanoacrylates (such as n-butyl-2-cyanoacrylate), octyl cyanoacrylates, allyl cyanoacrylate, β-methoxyethyl cyanoacrylate and combinations thereof. A particularly desirable one is ethyl-2-cyanoacrylate.

The cyanoacrylate component should be included in the compositions in an amount within the range of from about 50% to about 99.98% by weight, with the range of about 90% to about 99% by weight being desirable, and about 95% by weight of the total composition being particularly desirable.

The first accelerator may be selected from calixarenes and oxacalixarenes, silacrowns, crown ethers, cyclodextrins and combinations thereof.

Of the calixarenes and oxacalixarenes, many are known, and are reported in the patent literature. See e.g., U.S. Pat. Nos. 4,556,700, 4,622,414, 4,636,539, 4,695,615, 4,718,966, and 4,855,461, the disclosures of each of which are hereby expressly incorporated herein by reference.

For instance, as regards calixarenes, those within structure I are useful herein:

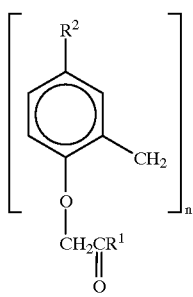

where $R^1$ is alkyl, alkoxy, substituted alkyl or substituted alkoxy; $R^2$ is H or alkyl; and n is 4, 6 or 8.

One particularly desirable calixarene is tetrabutyl tetra[2-ethoxy-2-oxoethoxy]calix-4-arene.

A host of crown ethers are known. For instance, examples which may be used herein either individually or in combination, or in combination with other first accelerators include 15-crown-5, 18-crown-6, dibenzo-18-crown-6, benzo-15-crown-5, dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphtyl-16-crown-5, 1,2-methyl-benzo-18-crown-6, 1,2-methylbenzo-5, 6-methylbenzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6 and 1,2-benzo-1,4-benzo-5-oxygen-20-crown-7. See U.S. Pat. No. 4,837,260 (Sato), the disclosure of which is hereby expressly incorporated here by reference.

Of the silacrowns, again many are known, and are reported in the literature. For instance, a typical silacrown may be represented within the following structure (II):

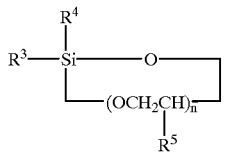

wherein $R^3$ and $R^4$ are organo groups which do not themselves cause polymerization of the cyanoacrylate monomer, $R^5$ is H or $CH_3$ and n is an integer of between 1 and 4. Examples of suitable $R^3$ and $R^4$ groups are R groups, alkoxy groups such as methoxy, and aryloxy groups such as phenoxy. The $R^3$ and $R^4$ groups may contain halogen or other substituents, an example being trifluoropropyl. However, groups not suitable as $R^4$ and $R^5$ groups are basic groups such as amino, substituted amino and alkylamino.

Specific examples of silacrown compounds useful in the inventive compositions include:

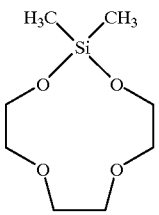

dimethylsila-11-crown-4 (III);

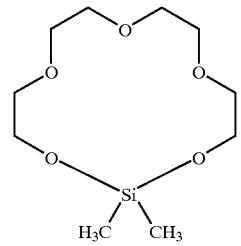

dimethylsila-14-crown-5 (IV);

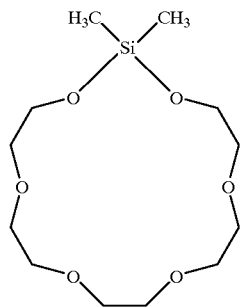

and dimethylsila-17-crown-6 (V). See e.g., U.S. Pat. No. 4,906,317 (Liu), the disclosure of which is hereby expressly incorporated herein by reference.

Many cyclodextrins may be used in connection with the present invention. For instance, those described and claimed in U.S. Pat. No. 5,312,864 (Wenz), the disclosure of which is hereby expressly incorporated herein by reference, as hydroxyl group derivatives of an α, β or γ-cyclodextrin which is at least partly soluble in the cyanoacrylate would be appropriate choices for use herein as the first accelerator component.

The first accelerator component should be included in the compositions in an amount within the range of from about 0.1% to about 5% by weight, with the range of about 0.1 to about 0.5% by weight being desirable, and about 0.2% by weight of the total composition being particularly desirable.

The second accelerator may be selected from a variety of poly(ethyleneglycol) di(meth)acrylates, ethoxylated hydric compounds and combinations thereof.

For instance, poly(ethylene glycol) di(meth)acrylates suitable for use herein include there within structure VI below:

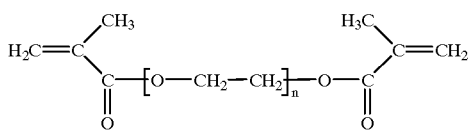

where n is greater than 3, such as within the range of 3 to 12, with n being 9 as particularly desirable. More specific examples include PEG 200 DMA, (where n is about 4) PEG 400 DMA (where n is about 9), PEG 600 DMA (where n is about 14), and PEG 800 DMA (where n is about 19), where the number (e.g., 400) represents the average molecular weight of the glycol portion of the molecule, excluding the two methacrylate groups, expressed as grams/mole (i.e., 400 g/mol). A particularly desirable PEG DMA is PEG 400 DMA.

And of the ethoxylated hydric compounds (or ethoxylated fatty alcohols, that may be employed, appropriate ones may be chosen from those within structure VII:

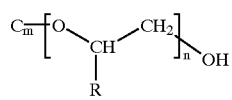

where $C_m$ can be a linear or branched alkyl or alkenyl chain, m is an integer between 1 to 30, such as from 5 to 20, n is an integer between 2 to 30, such as from 5 to 15, and R may be H or alkyl, such as $C_{1-6}$ alkyl.

Commercially available examples of materials within structure VI include those offered under the DEHYDOL tradename from Henkel KgaA, Dusseldorf, Germany, such as DEHYDOL 100.

The second accelerator component should be included in the compositions in an amount within the range of from about 0.01% to about 10% by weight, with the range of about 0.1 to about 0.5% by weight being desirable, and about 0.4% by weight of the total composition being particularly desirable.

Additives may be included in the inventive compositions to confer additional physical properties, such as improved shelf-life stability, thixotropy, increased viscosity, color, improved toughness, and enhanced resistance to thermal degradation. Such additives therefore may be selected from free radical stabilizers, anionic stabilizers, gelling agents, thickeners, dyes, toughening agents, thermal degradation enhancers, and combinations thereof.

In another aspect of the invention, there is provided a method of bonding together two substrates, at least one of which is constructed of materials, such as certain woods, cotton and cork. The method includes applying to at least one of the substrates a composition as described above, and thereafter mating together the substrates for a time sufficient to permit the adhesive to fixture. For many applications, the substrate should become fixed in less than 30 seconds, and depending on substrate as little as 1–3 seconds.

In yet another aspect of the invention, there is provided reaction products of the so-described compositions.

In still another aspect of the invention, there is provided a method of preparing the so-described compositions. The method includes providing a cyanoacrylate component, and combining therewith with mixing a first and second accelerator component.

In an additional aspect of the invention, there is provided a method of bonding together two substrates, at least one of which is constructed of a material selected from the group consisting of wood, cotton and cork, using the compositions of this invention. The method includes applying a the compositions to at least one of the substrates and mating together the substrates for a time sufficient to permit the composition to fixture.

These aspects of the invention will be further illustrated by the examples which follow.

EXAMPLES

We prepared four samples to evaluate their fixture speeds on a variety of substrates. The samples were prepared by mixing together the constituents in any order for a sufficient period of time to ensure substantial homogeneity of the constituents. Ordinarily, about 30 minutes would suffice, depending of course on the quantity of the constituents used. Prior to including the PEG DA, however, that constituent may normally be subjected to a rectification procedure. This procedure may involve addition of materials to inhibit cyanoacrylate polymerization thereby conferring stability to the formulation (such as conventional acidic materials), or removal (through conventional filtration and/or separation technology) of materials which if present would cause cyanoacrylate polymerization. Removal of such materials should improve the shelf life of the formulation (e.g., catalysts used to prepare that constituent, or starting materials or by products from the preparation thereof). The constituents of these samples are listed below in Table 1.

TABLE 1

| | Sample No. | | | |
|---|---|---|---|---|
| Component | 1 | 2 | 3 | 4 |
| Ethyl-2-cyanoacrylate | 95.4983 | 95.2983 | 95.0983 | 94.8983 |
| Tetrabutyl tetra(2-ethoxy-2-oxoethoxy)calix(4)arene | — | 0.4 | — | 0.4 |
| Polyethyleneglycol 400 dimethacrylate | — | — | 0.4 | 0.4 |
| Boron trifluoride | 0.0017 | 0.0017 | 0.0017 | 0.0017 |
| Hydroquinone | 0.5 | 0.5 | 0.5 | 0.5 |
| Polymethylmethacrylate | 4.0 | 4.0 | 4.0 | 4.0 |
| Total | 100 | 100 | 100 | 100 |

We applied each of Sample Nos. 1–4 to the substrates listed below in Table 2, and measured their fixture speeds and bond strengths. The fixture speed is the time from joining the two substrates (each of which being about 1 inch wide and being aligned with about a 0.5 inch overlap) sufficient to hold a 3 kg weight. The results are also shown in Table 2.

TABLE 2

| | | Sample No. | | | |
|---|---|---|---|---|---|
| Properties | Substrate | 1 | 2 | 3 | 4 |
| Fixture Times (secs) | Paper | 10–15 | 1–3 | 3–5 | 1–3 |
| | Cardboard | 20–30 | 1–3 | 3–5 | 1–3 |
| | Leather | No Bond | 1–3 | 15–20 | 1–3 |
| | Limba | >60 | 35–40 | 1–3 | 1–3 |
| | Obishi | 15–20 | 3–5 | 5–10 | 3–5 |
| | Teak | 3–5 | 1–3 | 1–3 | 1–3 |
| | White Deal | >60 | 5–10 | 15–20 | 3–5 |
| | Ash | 30–35 | 10–15 | 1–3 | 1–3 |
| | Cork | >60 | 15–20 | 20–25 | 10–15 |
| | Yellow Pine | 30–35 | 5–10 | 10–15 | 3–5 |

TABLE 2-continued

| Properties | Substrate | Sample No. 1 | 2 | 3 | 4 |
|---|---|---|---|---|---|
| | Plywood | >60 | 15–20 | 5–10 | 5–10 |
| | Ceramic (Butt Joint) | 30–40 | 5–10 | 15–20 | 5–10 |
| | Cotton | >90 | 30–40 | 30–40 | 20–30 |
| | Aluminium | 1–3 | 1–3 | 1–3 | 1–3 |
| | Polycarbonate | 1–3 | 1–3 | 1–3 | 1–3 |
| Bond Strength | GBMS [Mpa] | 17.2 ± 1.8 | 11.7 ± 1.0 | 12.4 ± 0.7 | 16.2 ± 1.7 |

As can be seen, Sample No. 4 (cyanoacrylate in combination with calixarene and PEG 400 DMA) demonstrates improved fixture speeds on certain substrates, namely the woods, white deal and yellow pine, cork and cotton. In addition, the bond strengths are improved over Sample Nos. 2 and 3, each of which contain one of the two accelerates in Sample No. 4.

Bond strength data on grit blasted mild steel are also shown, and here the inventive composition when cured showed improved performance over either of the compositions containing only one of the accelerators.

What is claimed is:

1. A cyanoacrylate adhesive composition comprising:
   (a) a cyanoacrylate component;
   (b) a first accelerator component selected from the group consisting of calixarenes and oxacalixarenes, silacrowns, cyclodextrins, and combinations thereof; and
   (c) a second accelerator component selected from the group consisting of poly(ethyleneglycol) di(meth) acrylates, ethoxylated hydric compounds, and combinations thereof.

2. The composition according to claim 1, wherein the cyanoacrylate component is selected from materials within the structure $H_2C=C(CN)—COOR$, wherein R is selected from $C_{1-15}$ alkyl, alkoxyalkyl, cycloalkyl, alkenyl, aralkyl, aryl, allyl and haloalkyl groups.

3. The composition according to claim 1, wherein the cyanoacrylate component comprises ethyl-2-cyanoacrylate.

4. The composition according to claim 1, wherein the calixarene is within the following structure

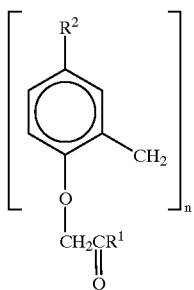

where $R^1$ is alkyl, alkoxy, substituted alkyl or substituted alkoxy; $R^2$ is H or alkyl; and n is 4, 6 or 8.

5. The composition according to claim 1, wherein the calixarene is tetrabutyl tetra[2-ethoxy-2-oxoethoxy]calix-4-arene.

6. The composition according to claim 1, wherein the first accelerator component is an oxacalixarene.

7. The composition according to claim 1, wherein the first accelerator component is a silacrown.

8. The composition according to claim 1, wherein the silacrown is selected from members within the group represented by the following structure:

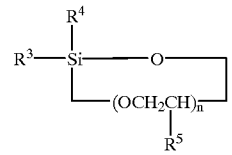

wherein $R^3$ and $R^4$ are organo groups which do not themselves cause polymerization of the cyanoacrylate monomer, $R^5$ is H or allyl and n is an integer between 1 and 4.

9. The composition according to claim 1, wherein the silacrown is a member selected from the group consisting of dimethylsila-11-crown-4, dimethylsila-14-crown-5, dimethylsila-14-crown-5, and combinations thereof.

10. The composition according to claim 1, wherein the first accelerator component is a cyclodextrin.

11. The composition according to claim 1, wherein the cyclodextrin is selected from members within the group consisting of α, β and γ-cyclodextrins, and combinations thereof.

12. The composition according to claim 1, wherein the poly(ethyleneglycol) di(meth)acrylate is within the following structure

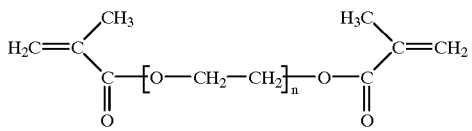

wherein n is greater than 3.

13. The composition according to claim 1, wherein the poly(ethyleneglycol) di(meth)acrylate is selected from the group consisting of poly(ethyleneglycol) 200 di(meth) acrylate, poly(ethyleneglycol) 400 di(meth)acrylate, poly (ethyleneglycol) 600 di(meth)acrylate, poly(ethyleneglycol) 800 di(meth)acrylate and combinations thereof.

14. The composition according to claim 1, wherein the poly(ethyleneglycol) di(meth)acrylate is poly(ethyleneglycol) 400 di(meth)acrylate.

15. The composition according to claim 1, wherein the second accelerator component is an ethoxylated hydric compound within the following structure

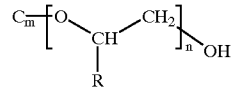

wherein $C_m$ is a linear or branched alkyl or alkenyl chain, m is an integer between 1 to 30, n is an integer between 2 to 30, and R is H or alkyl.

16. The composition according to claim 1, wherein the first accelerator component is used in an amount within the range of from about 0.01% by weight to about 5% by weight based on the total composition.

17. The composition according to claim 1, wherein the second accelerator component is used in an amount within the range of from about 0.01% by weight to about 5% by weight based on the total composition.

18. The composition according to claim 1, further comprising additives selected from the group consisting of free radical stabilizers, anionic stabilizers, gelling agents, thickeners, dyes, toughening agents, thermal degradation enhancers, and combinations thereof.

19. The composition according to claim 1, wherein the cyanoacrylate is used in an amount within the range of from about 90% to about 99.98% by weight based on the total composition, the first accelerator component is used in an amount within the range of from about 0.01% by weight to about 5% by weight based on the total composition, and the second accelerator component is used in an amount within the range of from about 0.01% by weight to about 5% by weight based on the total composition.

20. The composition according to claim 1, wherein the cyanoacrylate component is ethyl-2-cyanoacrylate in an amount within the range of about 94% to about 95.8% by weight of the total composition, the first accelerator component is tetrabutyl tetra[2-ethoxy-2-oxoethoxy]calix-4-arene in an amount of about 0.2% by weight of the total composition, and the second accelerator component is poly (ethylene glycol) (400) di(meth)acrylate in an amount within the range of about 4% by weight of the total composition.

21. Reaction products of the composition according to claim 1.

22. A method of bonding together two substrates, at least one of which is constructed of a material selected from the group consisting of wood, cotton and cork, comprising the steps of:

applying a cyanoacrylate-containing adhesive composition according to claim 1, to at least one of the substrates and mating together the substrates for a time sufficient to permit the adhesive to fixture.

23. A method of preparing a cyanoacrylate-containing composition according to claim 1, comprising the steps of:

providing a cyanoacrylate component, and combining therewith with mixing a first accelerator component and a second accelerator component.

* * * * *

UNITED STATES PATENT AND TRADEMARK OFFICE
CERTIFICATE OF CORRECTION

PATENT NO. : 6,294,629 B1
DATED : September 25, 2001
INVENTOR(S) : Liam P. O'Dwyer et al.

It is certified that error appears in the above-identified patent and that said Letters Patent is hereby corrected as shown below:

Column 1,
Line 14, change "Cyanaoacrylate" to -- Cyanoacrylate --

Column 6,
Line 3, delete "a"

Signed and Sealed this

Twenty-third Day of July, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,294,629 B1  Page 1 of 1
DATED : September 25, 2001
INVENTOR(S) : O'Dwyer et al.

It is certified that error appears in the above-identified patent and that said Letters Patent is hereby corrected as shown below:

<u>Column 5,</u>
Line 19, reads "...alcohols,..." should read -- ...alcohols),... --.

Signed and Sealed this

Eighth Day of April, 2003

JAMES E. ROGAN
*Director of the United States Patent and Trademark Office*